Figure 1:
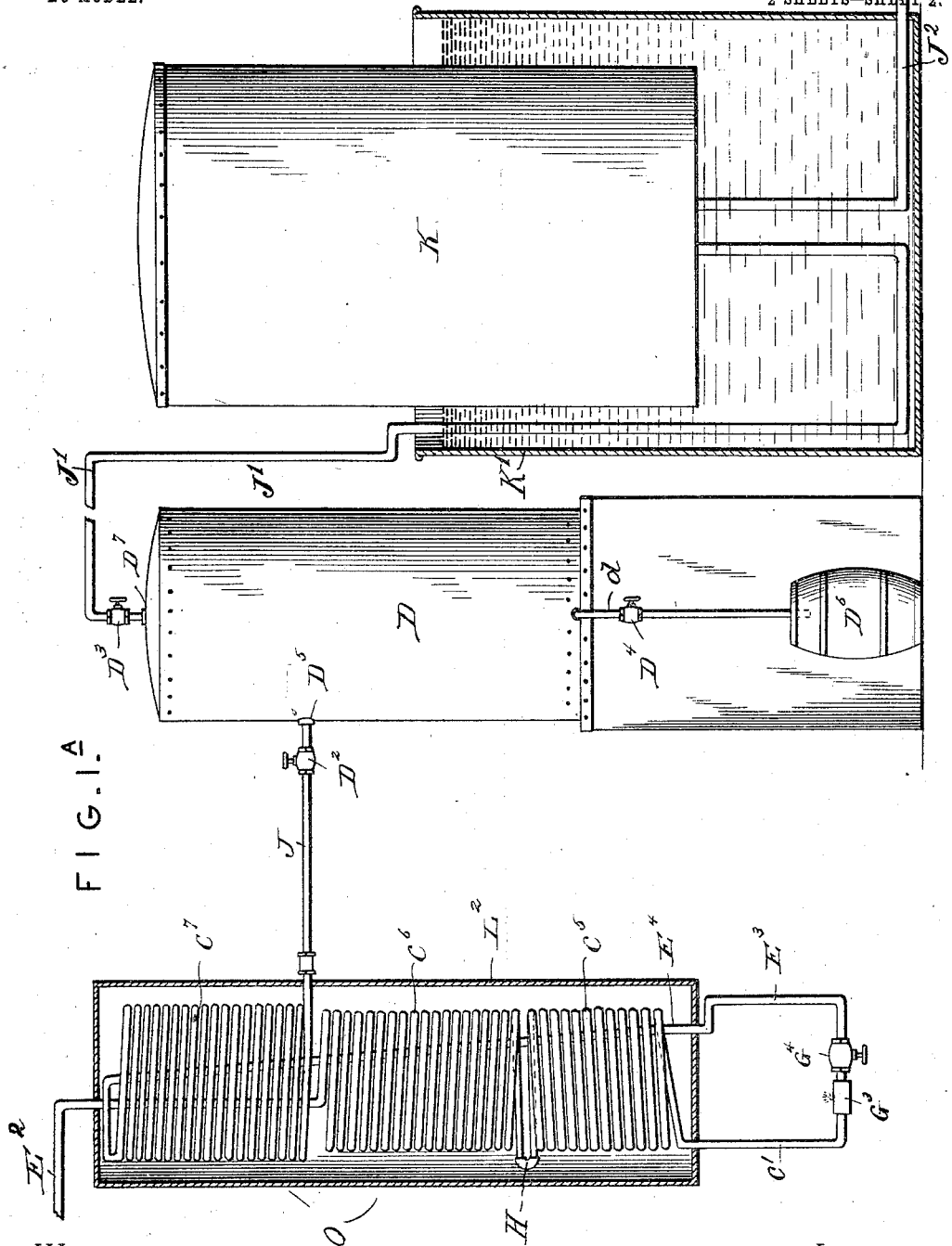

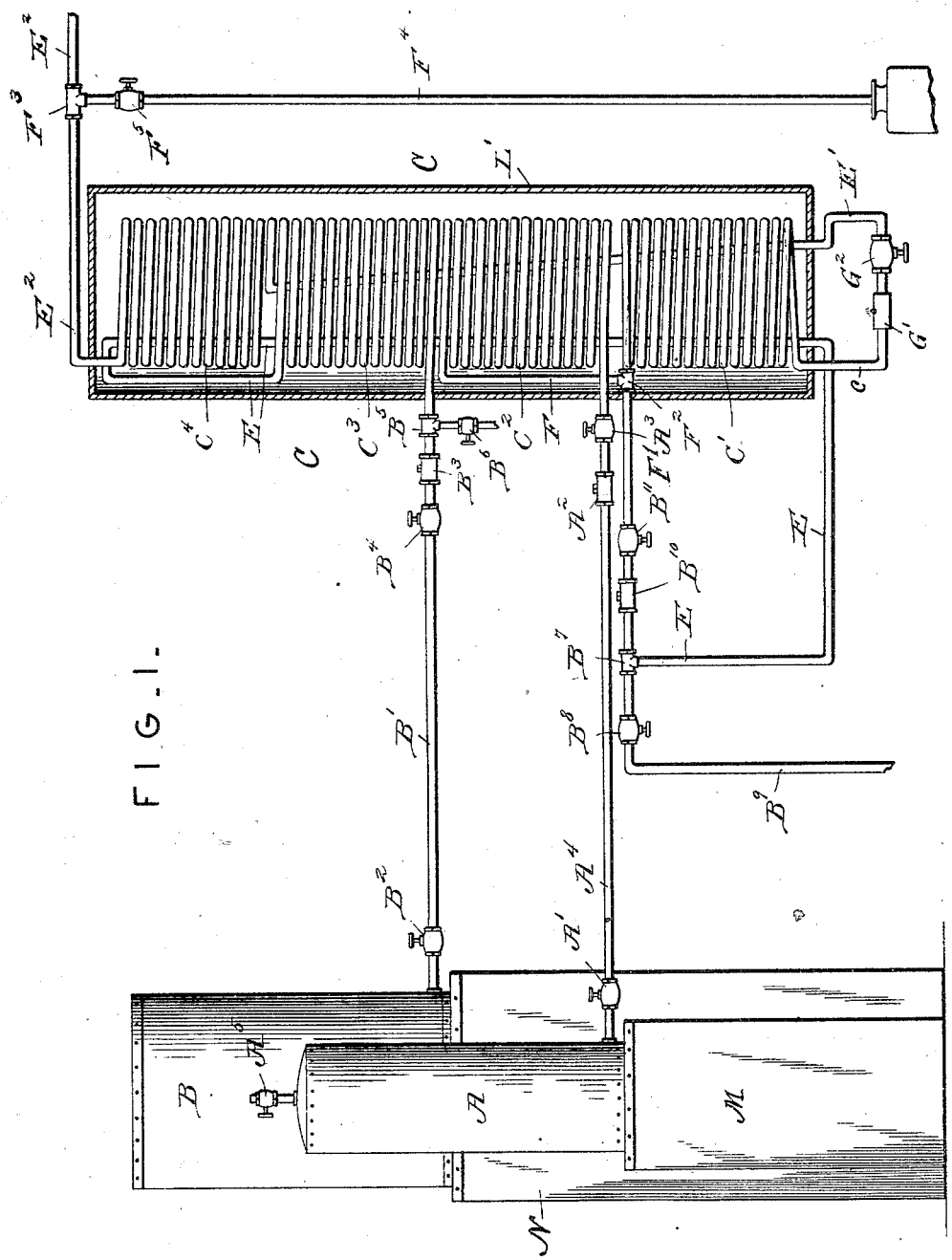

No. 726,379. PATENTED APR. 28, 1903.
C. W. TURNER.
GAS GENERATOR.
APPLICATION FILED AUG. 15, 1902.
NO MODEL. 2 SHEETS—SHEET 2.

WITNESSES:
Harry L. Amer.
Lewis P. Boynton.

INVENTOR
Charles Worth Turner.
BY Belva A. Lockwood
Attorney

UNITED STATES PATENT OFFICE.

CHARLES WORTH TURNER, OF BROOKLYN, NEW YORK.

GAS-GENERATOR.

SPECIFICATION forming part of Letters Patent No. 726,379, dated April 28, 1903.

Application filed August 15, 1902. Serial No. 119,707. (No model.)

*To all whom it may concern:*

Be it known that I, CHARLES WORTH TURNER, a citizen of the United States, residing at 5 Montague Terrace, in the city of Brooklyn and State of New York, have invented certain new and useful Improvements in an Apparatus for the Manufacture of Oxyhydrocarbon Gas, a New Gas, and for the Production of said Gas; and I do hereby declare the following to be a full, clear, and exact description of the invention, such as will enable others skilled in the art to which it appertains to make and use the same and to mix the composition from which said gas is made.

This invention relates to apparatus for manufacturing a compound oxyhydrocarbon gas from hydrocarbon oil and water under high heat and pressure.

The object of my invention is to provide for economically and rapidly generating my compound gas adapted for heating and illuminating purposes by separately vaporizing water and making superheated steam in one set of coils, separately vaporizing a suitable hydrocarbon oil, such as petroleum or any suitable gas-oil, in a set of coils, then mixing the superheated steam and hydrocarbon vapors in suitably-regulated proportions and subjecting them in the mixed condition to a high heat in a combining and superheating coil, thereby producing a fuel gas or vapor, then subjecting such gas or vapor to further heat and pressure in a separate coil or sets of coils in a column for causing the desired decomposition and recomposition of the gases to produce oxyhydrocarbon gas.

The matter constituting my invention herein will be set forth in the claims.

I will now describe the details of construction and operation of my improved gas-generating apparatus by reference to the accompanying drawings, in which—

Figure 1 represents a front elevation, partly in section, of a part of my gas-generating apparatus. Fig. 1$^A$ represents an elevation, partly in section, of a continuation of my gas-generating apparatus.

My apparatus is constructed principally of two columns of steel coils, composed of different sets of coils suitably connected together and inclosed in heat-retaining jackets or shells, suitable water and oil supply tanks, a separating-tank for the gas and combustible liquid produced in said coils, a gas-holder, and suitable connecting-pipes provided with stop-cocks, check-valves and burners.

The hydrocarbon-oil tank A is mounted on a suitable support M at a level for feeding oil by gravity or by air-pressure, if required, and has connecting near the bottom the outlet feed-pipe $A^4$, which is provided near the tank with a stop-cock $A'$ and near the column of coils with a stop-cock $A^3$ and a check-valve $A^2$. This feed-pipe $A^4$ connects with the base of the oil-vaporizing coil $C^2$. Tank A is also provided at the top with a supply-pipe having a stop-cock $A^5$, through which oil may be supplied to the tank or to which a pipe may be attached, leading from an air-pump for admitting air under pressure to force oil into the vaporizing-coil. The water-tank B is mounted at the proper level on the support N and has leading from its lower end the water-feed pipe $B'$, having near the tank a stop-cock $B^2$ and near the column of coils the check-valve $B^3$ and stop-cock $B^4$. The supply-pipe $B'$ connects with the base of the water-vaporizing or steam-generating coil $C^3$. A T-fitting $B^5$ is connected in the pipe $B'$ near the coils and has connected thereto a drain-pipe provided with a stop-cock $B^6$. This drain-pipe and stop-cock serve for drawing off any water which may condense in the coil $C^3$ when it is out of use. The column C of coils comprises the base-coil $C'$ for combining and superheating the vapors of water and hydrocarbon oil, the coil $C^2$ for vaporizing oil, the coil $C^3$ for vaporizing water and superheating steam, and the coil $C^4$ for further superheating the mixed vapors and gases, all of said coils being arranged one above another in a column and inclosed within a heat-retaining jacket or shell $L'$. In practice this shell $L'$ may be lined with fire-brick for retaining the heat and confining it close around the column of coils. The coils are preferably made of heavy steel tubes or pipes with extra thick walls to withstand the intense heat and high internal pressure produced in the operation of generating my compound oxyhydrocarbon gas. The coils $C'$, $C^2$, $C^3$, and $C^4$ in the column C are connected together by steel tubes, as follows: The vapor-outlet pipe F leads down from the top of coil $C^2$ and connects at its lower end with the T connection $F^2$ in the vapor mixing and inlet pipe $F'$, which connects with the top of the vapor combining and superheating coil $C'$. A steel tube E connects with the upper end of the water-vaporizing coil $C^3$ and extends up outside of the column, and thence down through the center of the column of coils, out at the base thereof, and up to the T connection $B^7$ in the vapor-mixing pipe $F'$. The mixing-pipe $F'$ extends to the left of the T connection $B^7$, where it is provided with a stop-cock $B^8$, from which extends downward a vapor-blow-off pipe $B^9$, which may be used as a test-pipe to show the condition of the vapor and also for relieving the pressure when it becomes too high in the coils. Between the T connections $B^7$ and $F^2$ the mixing-pipe $F'$ is provided with a check-valve $B^{10}$ and a stop-cock $B^{11}$. The check-valves $A^2$ and $B^3$ prevent the return of oil and water through the feed-pipes $A^4$ and $B'$, and the check-valve $B^{10}$ prevents the return of steam through the pipe E. Both oil-vapor and superheated steam are passed through the pipe $F'$ into the combining and superheating coil $C'$, where they are subject to a high heat and sufficiently combined and converted into gas to be burned. At the base of the coil $C'$ an outlet-pipe $c$ extends downward and curves inward and is provided below the column with the coupler $G'$, having a vent-opening for the escape of vapor. This vent-opening may serve as the burner-orifice, or any suitable burner which may be required in a large generating apparatus may be connected in place of the coupler $G'$. A bent steel tube $E'$ connects with the coupler $G'$ and is provided with a stop-cock $G^2$, and beyond such stop-cock extends upward through coils $C'$, $C^2$, and $C^3$ and connects with the base of the coil $C^4$ at the top of the column. An outlet-pipe $E^2$ leads from the top of the coil $C^4$ and connects with the second column of coils O, as shown in Fig. 1$^A$. It extends down through the upper coil $C^7$ and connects with the upper end of the middle coil $C^6$. This second column O is preferably composed of three sets of coils, as $C^5$ at the base, coil $C^6$ above the same, and the enlarged coil $C^7$ at the top of the column. The top of the coil $C^5$ is connected by the return-bend H to the base of coil $C^6$. A gas-outlet pipe $c'$ leads from the base of coil $C^5$ and is bent inward and provided with a coupler $G^3$, having a vent-opening or burner for the escape of gas to be burned in the column O for heating the coils thereof. The bent steel tube $E^3$, provided with a stop-cock $G^4$, is connected to the coupler $G^3$ and extends upward through the column of coils and connects with the top of the coil $C^7$. At the base of coil $C^7$ connects the gas-outlet pipe J, which connects at $D^5$ with separator-tank D and is provided with a valve $D^2$ for controlling the flow of gas and combustible liquid into the tank D. The separator-tank D is composed of galvanized iron and is mounted on a suitable support. The gas-outlet pipe $J'$ connects at $D^7$ in the head of the tank and is provided with a controlling-valve or stop-cock $D^3$. The outlet gas-pipe $J'$ extends downward and then upward into the floating gas-holder K. A similar pipe $J^2$ leads out from the holder to any place where the gas is to be used. The floating holder K is supported in the water-tank $K'$ in the usual well-known manner. An outlet-pipe $d$ for combustible liquid connects with the bottom of the separator-tank D and is provided with a stop-cock $D^4$ and extends down into a receiving and storage vessel $D^6$.

A vent and test pipe $F^4$, having a stop-cock $F^5$, connects with the T-coupler $F^3$ in the gas-pipe $E^2$ and extends down into a receiving vessel at the base of the apparatus. Part of the gas may be drawn off through the pipe $F^4$ for testing the same or for any other desired purpose.

The apparatus having been constructed and connected as above described and the tanks A and B, respectively, filled with oil and water, the operation of making my oxyhydrocarbon gas may be conducted as follows: Air may be admitted under pressure through the stop-cock $A^5$ for forcing oil to the vaporizing-coil. The stop-cock $A'$ is fully opened, permitting oil to flow through pipe $A^4$, and the stop-cock $A^3$ is partly opened for regulating the supply of oil to the coil $C^2$. In starting the apparatus only a small quantity is at first admitted to the coil $C^2$, and then the supply is shut off and a torch or a small flame is burned in the interior of the column of coils until the oil in the coil $C^2$ is vaporized for supplying a jet of combustible vapor at the burner-orifice in the coupler $G'$. The vapor is burned until the column of coils is well heated. The oil-vapor as generated in the coil $C^2$ passes through pipe F and thence through the superheating-coil $C'$ to the burner. The coil $C^3$, having been sufficiently heated, the stop-cock $B^2$ near the water-tank is opened and water allowed to flow through the feed-pipe $B'$ to the stop-cock $B^4$, which is partly opened and used to regulate the supply of water admitted to the base of the vaporizing and superheating coil $C^3$. The relative proportions of oil and water supplied to the vaporizing-coils $C^2$ and $C^3$ will be regulated by the stop-cocks $A^3$ and $B^4$ for making my compound oxyhydrocarbon gas. The flow of oil and water having been established in the proper proportions to the coils $C^2$ and $C^3$, the highly-heated oil-vapor passes down through pipe F to the mixing-pipe $F'$, and at the same time the superheated steam passes off from the top of coil $C^3$ through pipe E, passing down through the column of coils and thence into the mixing-pipe $F'$, in which it passes through the valve $B^{11}$ and forces the oil-vapor thence down through the combining and superheating coil $C'$. The superheated steam and oil-vapors are here subjected to such heat and pressure as to cause partial decomposition of the steam and hydrocarbon vapors to produce a combustible gas which passes off through the pipe $c$ to the coupler $G'$, where a jet thereof is ignited and burned for heating the column of coils. A large percentage of the escaping combustible vapors passes off through valve $G^2$ and pipe $E'$ into the base of the coil $C^4$, where they are subjected to further heat for causing them to combine to make fixed gas. Decomposition and recomposition of the steam and oil-vapors having been partially effected, the resulting vapors and gas pass off from coil $C^4$ through pipe $E^2$ down into the middle decomposing-coil $C^6$, thence through the same, and through the connected coil $C^5$, where decomposition and recomposition of the vapors and gases are continued to form a fixed gas. The second column of coils O may be preliminarily heated up in any desired manner, and as soon as combustible gas passes off from the base of coil $C^5$ through the pipe $c'$ it is ignited at the jet-orifice in the coupler $G^3$, causing a large flame to pass up through the center of the column of coils and highly heat the same. The stop-cock $G^4$ being opened, a large percentage of the gas passes from the coupler $G^3$ up through the pipes $E^3$ and $E^4$ in the interior of the column of coils and thence into the top of the coil $C^7$, where it is subjected to further heat and pressure. The resulting gas finally passes off from the base of the coil $C^7$ through the pipe J and stop-cock $D^2$ into the separating and expansion tank D, where the liquefied portion of the gas resulting from the high pressure to which it has been subjected in the coils falls to the bottom of the tank, while the gas passes off through the stop-cock $D^3$ and pipe $J'$ into the holder K. When desired, the stop-cock $D^4$ in the liquid-outlet pipe $d$ may be opened, and the combustible liquid which has accumulated in the tank D may be drawn off into the receptacle $B^6$.

Having described my invention, what I claim, and desire to secure by Letters Patent, is—

1. In an apparatus for generating oxyhydrocarbon gas, the combination with an oil-vaporizing coil having an oil-supply pipe and stop-cock, and a water vaporizing and superheating coil having a water-supply pipe and stop-cock, of a vapor combining and superheating coil having an outlet-pipe and connecting-burner below the same, and suitable pipe connections from said vaporizing-coils to said combining and superheating coil, substantially as described.

2. An apparatus for generating oxyhydrocarbon gas constructed with a water vaporizing and superheating coil, an oil-vaporizing coil, and a vapor combining and superheating coil, arranged one above another in a column, said vaporizing-coils having respectively, supply-pipes, provided with stop-cocks for water and oil, and said combining and superheating coil having a supply-pipe with which connect the discharge-pipes from said vaporizing-coils, and also having a discharge-pipe and a connecting-burner below the column of coils, substantially as described.

3. In an apparatus for generating oxyhydrocarbon gas, the combination with a coil for generating and superheating steam, a water-supply tank and a pipe, having a stop-cock and check-valve connecting it with said coil, of an oil-vaporizing coil, an oil-tank and connecting-pipe having a stop-cock and check-valve, a vapor mixing and supply pipe having a stop-cock and check-valve, connections from said coils to said mixing-pipe, a vapor combining and superheating coil connecting with said mixing-pipe, and having a burner arranged to discharge a jet of flame through said coils, substantially as described.

4. In an apparatus for generating oxyhydrocarbon gas, the combination with an oil-vaporizing coil having an oil-supply pipe and stop-cock, and a water vaporizing and superheating coil having a water-supply pipe and stop-cock, of a vapor combining and superheating coil having an outlet-pipe and connecting-burner below the same, suitable pipe connections from said vaporizing-coils to said combining and superheating coil, separate decomposing-coils for combining and fixing the gases, and having a discharge-pipe and burner below the coil or coils, and the necessary connecting-pipes, substantially as described.

5. An apparatus for generating oxyhydrocarbon gas comprising a column of coils containing a coil for generating and superheating steam, a separate oil-vaporizing coil, a separate vapor combining and superheating coil having an outlet-pipe and burner below said column, a second column of coils containing decomposing-coils for combining and fixing the vapors and gases and having a discharge-pipe and burner below said column, a separating-tank for separating gas and liquid produced in said coils, suitable supply-pipes for oil and water and vapor-pipes connecting said coils one with another and with the separating-tank and provided with necessary stop-cocks and valves, substantially as described.

In testimony whereof I affix my signature in presence of two witnesses.

CHARLES WORTH TURNER.

Witnesses:
 BELVA A. LOCKWOOD,
 LEWIS T. BOYNTON.